(12) United States Patent
Schroeder et al.

(10) Patent No.: US 6,505,727 B2
(45) Date of Patent: Jan. 14, 2003

(54) SLIDE GATE FOR A CONVEYOR SYSTEM

(75) Inventors: Thomas A. Schroeder, Omaha, NE (US); Antje M. Skiff, Lincoln, NE (US); Kris R. Ream, Elkhorn, NE (US)

(73) Assignee: Intersystems, a division of Enduro Systems, Inc., Omaha, NE (US)

( * ) Notice: Subject to any disclaimer, the term of this patent is extended or adjusted under 35 U.S.C. 154(b) by 50 days.

(21) Appl. No.: 09/842,592

(22) Filed: Apr. 26, 2001

(65) Prior Publication Data

US 2002/0157928 A1 Oct. 31, 2002

(51) Int. Cl.[7] ............................................. B65G 37/00
(52) U.S. Cl. ............... 198/359; 198/735.4; 198/370.01; 198/860.4
(58) Field of Search .................... 198/735.4, 860.4, 198/530, 359, 360, 370.01, 735.3

(56) References Cited

U.S. PATENT DOCUMENTS

| | | | |
|---|---|---|---|
| 489,289 A | * | 1/1893 | Dodge |
| 844,033 A | * | 2/1907 | Munn |
| 3,346,092 A | * | 10/1967 | Bowden et al. |
| 3,351,180 A | * | 11/1967 | Herzog |
| 3,550,759 A | * | 12/1970 | Papen |
| 3,774,751 A | * | 11/1973 | Bakker ....................... 119/56.2 |
| 4,023,673 A | | 5/1977 | Hansen ........................ 198/735 |
| 4,058,199 A | | 11/1977 | Schlagel ..................... 198/370 |
| 4,201,287 A | | 5/1980 | Straub et al. ............... 198/530 |
| 4,301,913 A | | 11/1981 | Braun et al. ................ 198/735 |
| 4,378,063 A | | 3/1983 | Silverthorn ................. 198/735 |
| 4,568,237 A | | 2/1986 | Krause et al. .............. 414/519 |
| 5,392,900 A | | 2/1995 | Sandwall ................. 198/860.4 |
| 6,059,094 A | * | 5/2000 | Swanstrom et al. ........ 198/359 |
| 6,119,849 A | | 9/2000 | Svejkovsky et al. ..... 198/860.4 |

* cited by examiner

*Primary Examiner*—Christopher P. Ellis
*Assistant Examiner*—Richard Ridley
(74) *Attorney, Agent, or Firm*—Thomte, Mazour & Niebergall; Dennis L. Thomte (57) ABSTRACT

A slide gate is disclosed for use with an elongated conveyor including a conveyor housing having a bottom section including downwardly and inwardly extending side portions and a flat bottom wall having a discharge opening formed therein. A flat slide gate is selectively slidably movable on the housing between a closed position wherein the slide gate closes the discharge opening and an open position wherein the slide gate is retracted for the discharge opening.

11 Claims, 9 Drawing Sheets

SLIDE GATE FOR A CONVEYOR SYSTEM

BACKGROUND OF THE INVENTION

1. Field of the Invention

This invention relates to a conveyor and more particularly to a slide gate for a conveyor.

2. Description of the Related Art

In the past, many types of conveyors have been provided for conveying a wide variety of bulk or particulate material. The conveyors normally include an elongated conveyor housing having a head end and a tail end which has an endless chain extending around tail and head pulleys with the chain having a plurality of spaced-apart flights thereon. In many cases, gates are provided in the conveyor housing between the tail and head ends thereof so that the materials being conveyed may be discharged therefrom. In most cases, the bottom wall of the conveyor housing has a discharge opening therein which is selectively opened and closed by means of a slide gate. Normally, the slide gate is positioned closely adjacent the bottom surface of the bottom of the conveyor housing which means that a recessed or vacant area is created above the slide gate when it is in its closed position. The particulate materials will accumulate in the recessed area, since the flights normally are not able to move downwardly into the recessed area above the slide gate to completely clean the recessed area. Thus, when the conveyor is used to convey several different materials, contamination can occur, since it is not possible to completely clean the conveyor housing.

A further disadvantage in the conventional slide gates is that they do not adequately seal the discharge opening when in their closed position which permits dust to escape from the interior of the conveyor housing.

SUMMARY OF THE INVENTION

A slide gate apparatus is disclosed for use with an elongated conveyor including a conveyor housing having a bottom having a discharge opening formed therein. In the preferred embodiment, the bottom of the conveyor housing includes downwardly and inwardly extending side portions which have a flat bottom wall extending between the lower ends thereof. The discharge opening is formed in the bottom wall by removing a quadrilateral-shaped portion therefrom. The conveyor includes a chain which extends around head and tail pulleys and which has spaced-apart flights mounted thereon. A slide gate support is positioned beneath and to one side of the conveyor housing adjacent the discharge opening. A flat slide gate is mounted on the slide gate support and is selectively slidably movable between a closed position wherein the slide gate closes the discharge opening and an open position wherein the slide gate is retracted from the discharge opening. The slide gate is transversely movable with respect to the longitudinal axis of the conveyor housing. The slide gate is received within the discharge opening when the slide gate is in its closed position. When the slide gate is in its closed position, the top or upper surface thereof is substantially flush with the top or upper surface of the bottom wall. The slide gate support includes a pair or side seals positioned at opposite sides of the discharge opening and which extend upwardly and outwardly therefrom. When the slide gate is in its closed position, the upper surface of the slide gate is closely positioned against the underside of the side seals to prevent the escape of material and dust from the interior of the conveyor housing. Inclined ramps are provided in the slide gate support at the tail and head ends of the discharge opening and which are positioned therebelow to aid in causing the slide gate to move into a position wherein the upper surface thereof is flush with the upper surface of the bottom wall of the conveyor housing.

It is therefore a principal object of the invention to provide an improved slide gate for a conveyor.

A further object of the invention is to provide a slide gate for a conveyor wherein the upper surface of the slide gate, when the slide gate is in its closed position, is substantially flush with the upper surface of the bottom wall of the conveyor housing.

A further object of the invention is to provide an improved slide gate for use with a conveyor which prevents the escape of material and dust from the interior of the conveyor housing.

Still another object of the invention is to provide a slide gate for use with an elongated conveyor wherein the slide gate apparatus includes means for guiding the slide gate into its closed position so that the upper surface of the slide gate is substantially flush with the upper surface of the bottom wall of the conveyor housing.

A further object of the invention is to provide a slide gate for use with an elongated conveyor which prevents the accumulation of the material being conveyed above the slide gate.

These and other objects will be apparent to those skilled in the art.

DESCRIPTION OF THE PREFERRED EMBODIMENT

The slide gate apparatus of this invention is referred to generally by the reference numeral 10 and is designed for use with an elongated conveyor 12 including a conveyor housing 14 having a tail end 16 and a head end 18. The numeral 20 refers to a tail sprocket which is mounted on tail shaft 22. A head sprocket is mounted in the head end of the conveyor 12 and is supported upon the shaft 24 in conventional fashion. An endless chain 26 extends around the tail and head sprockets and has a plurality of spaced-apart flights 28 mounted thereon. Housing 14 is comprised of a plurality of housing sections which are bolted together in an end-to-end manner.

Figure 1:
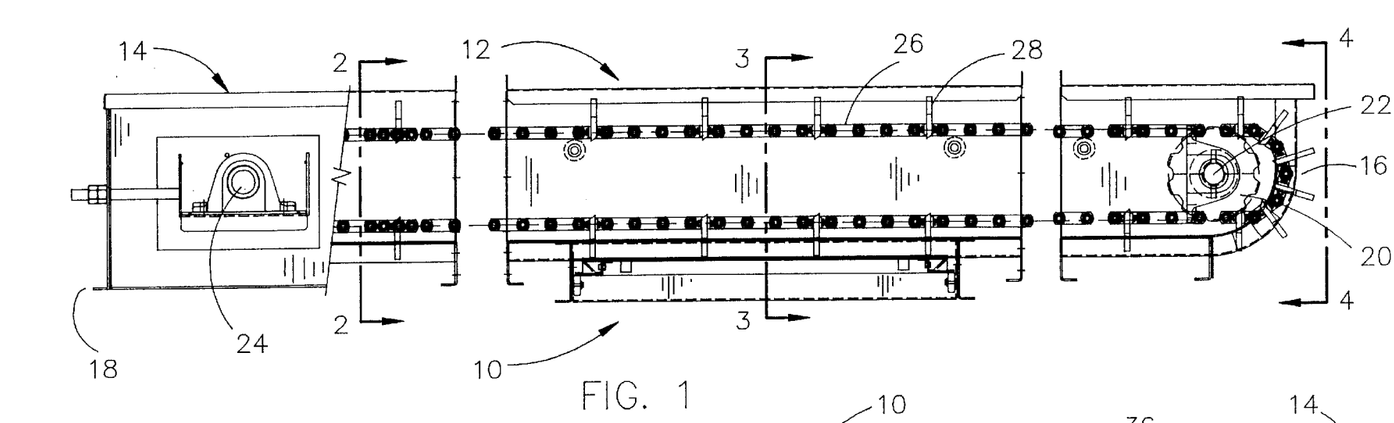
FIG. 1 is a partial side elevational view of the slide gate apparatus of this invention with portions of the conveyor housing cut away to more fully illustrate the invention.
Figure 2:
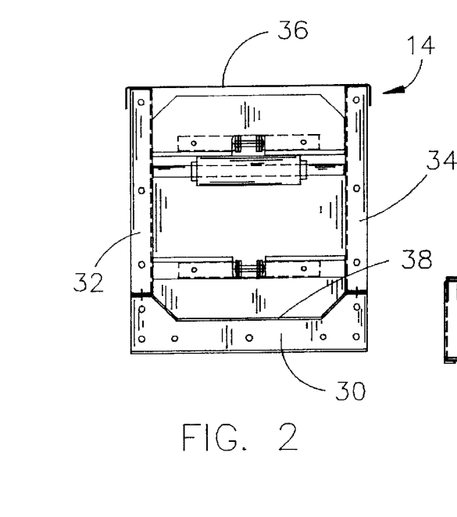
FIG. 2 is a view seen on lines 2—2 of FIG. 1.
Figure 3:
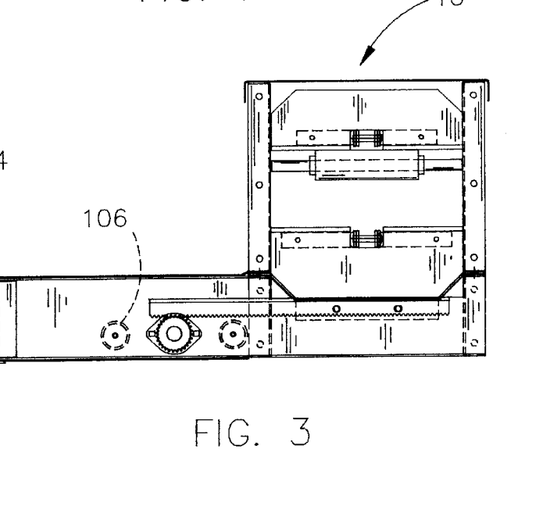
FIG. 3 is a view seen on lines 3—3 of FIG. 1.
Figure 4:
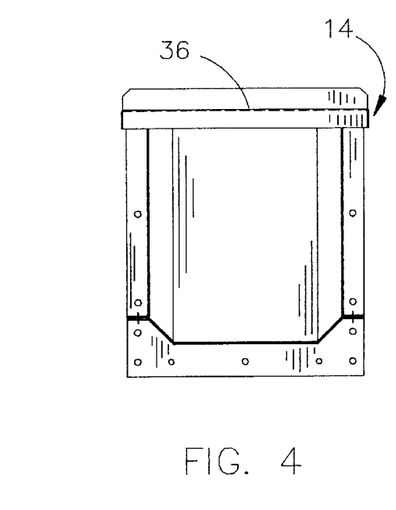
FIG. 4 is a view seen on lines 4—4 of FIG. 1.
Figures 7, 8:
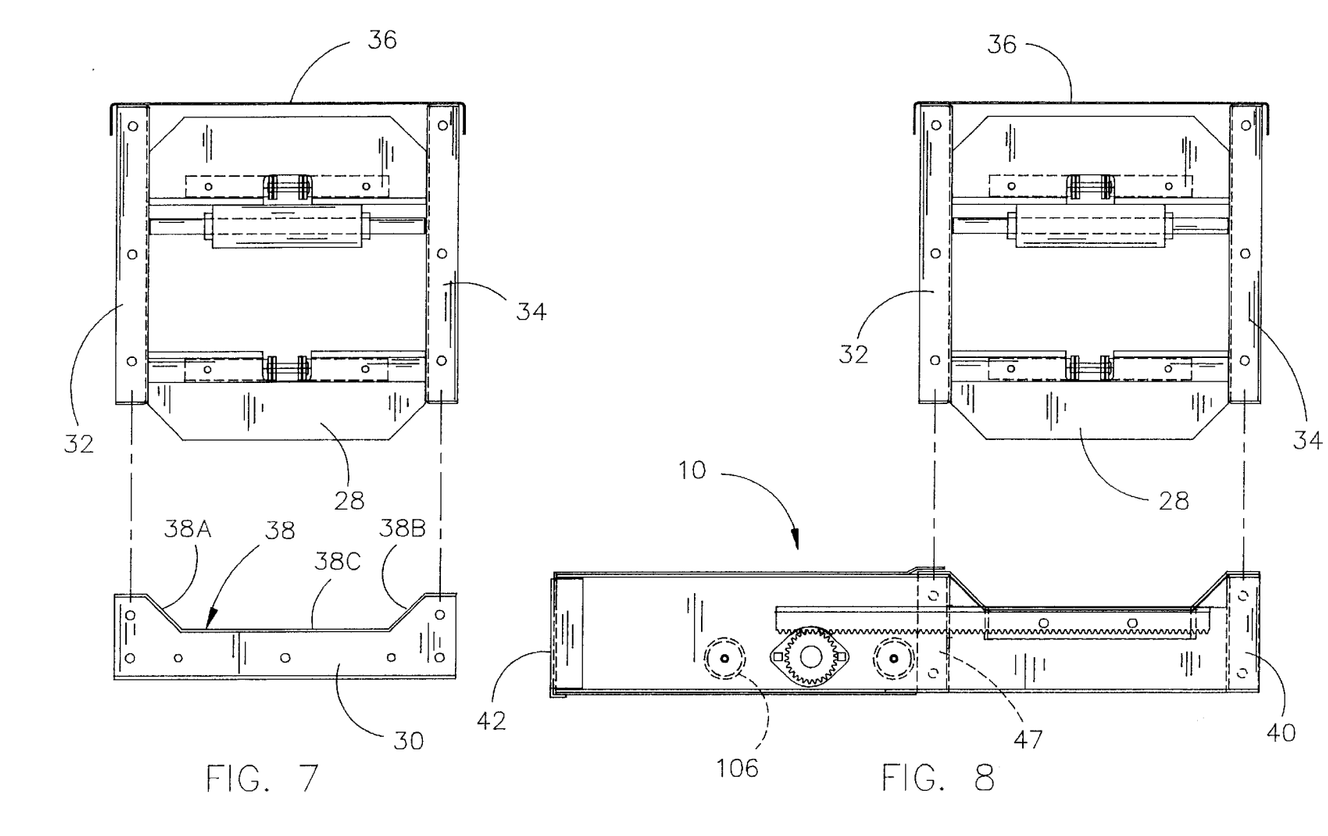
FIG. 7 is an exploded elevational view of the conveyor.
FIG. 8 is an exploded elevational view which illustrates the relationship of certain components of the invention.
Figure 9:
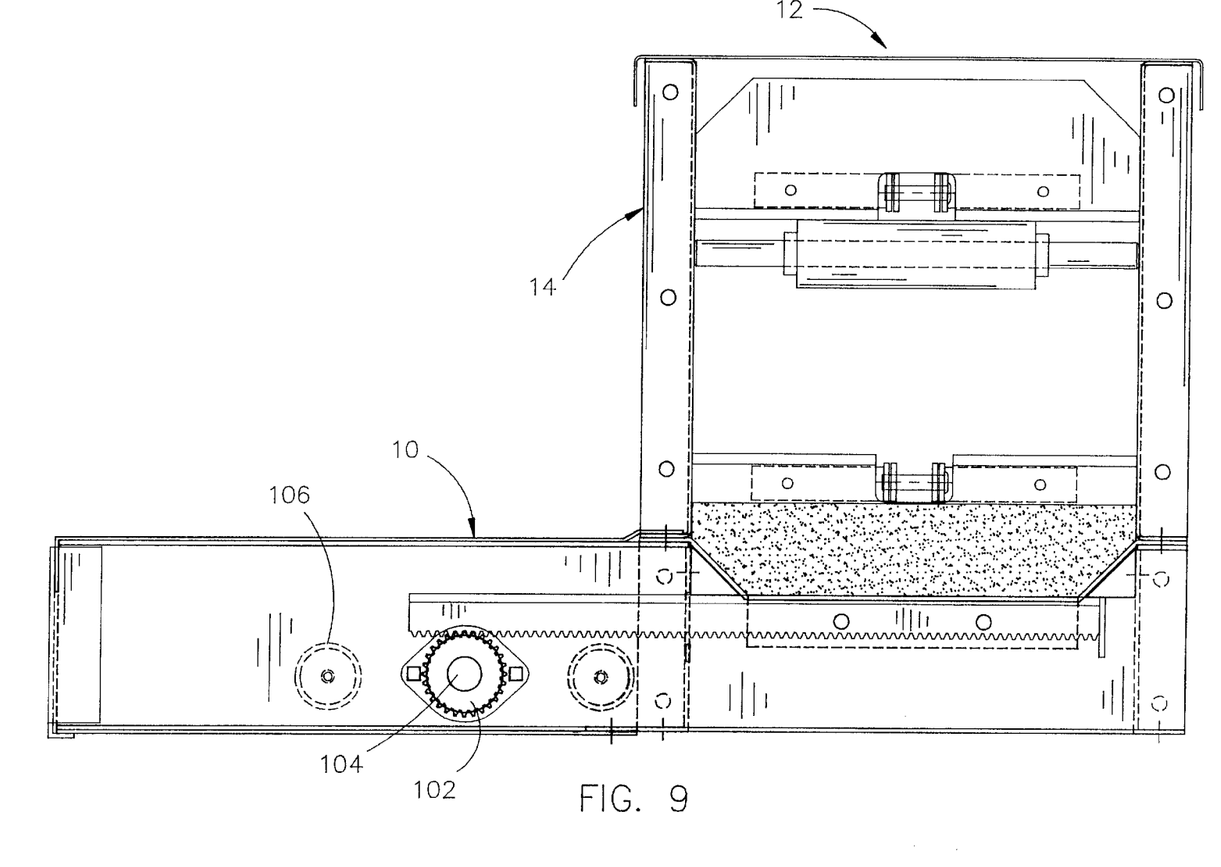
FIG. 9 is an end elevational view of the slide gate apparatus mounted on the conveyor housing with the slide gate in its closed position.
Figure 10:
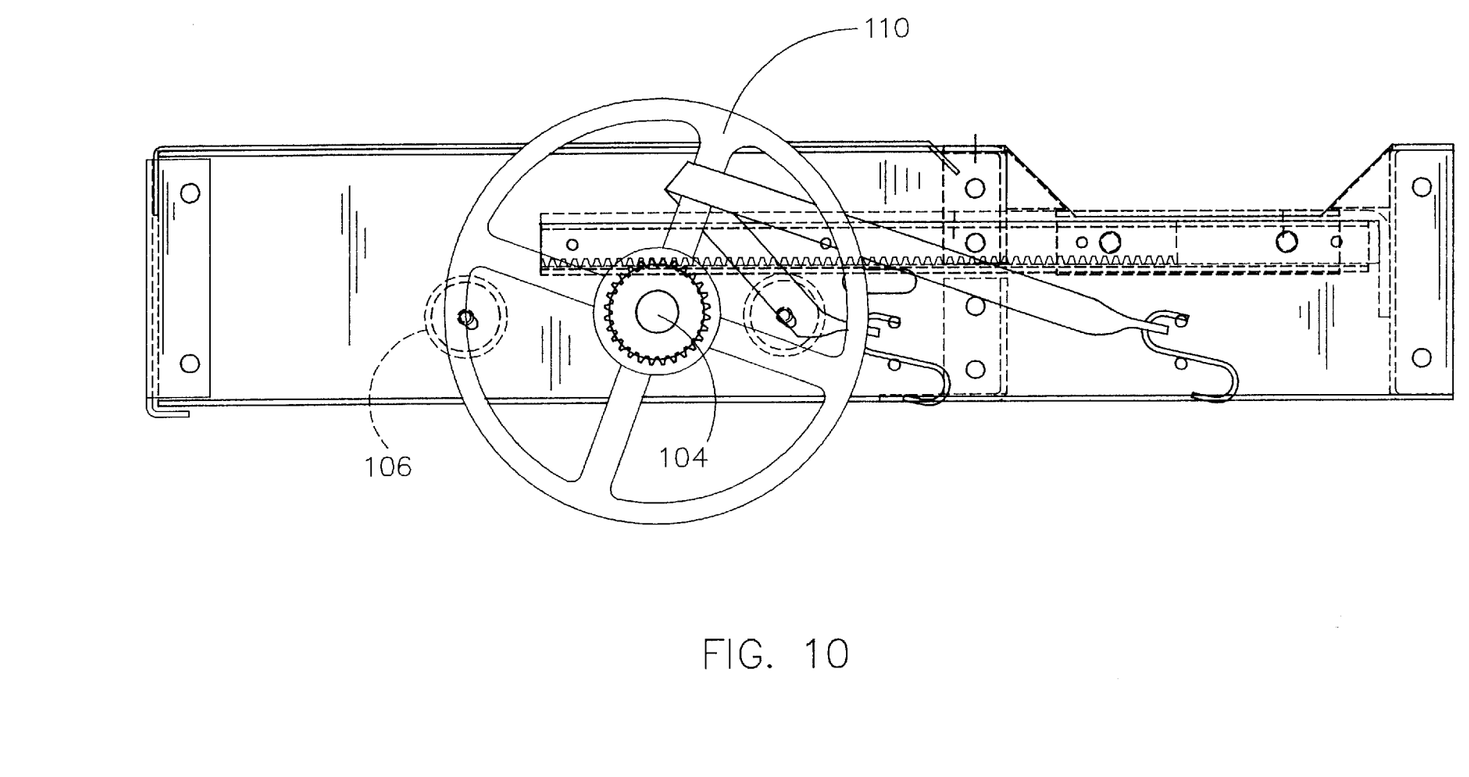
FIG. 10 is a side elevational view of the slide gate apparatus.
Figure 11:
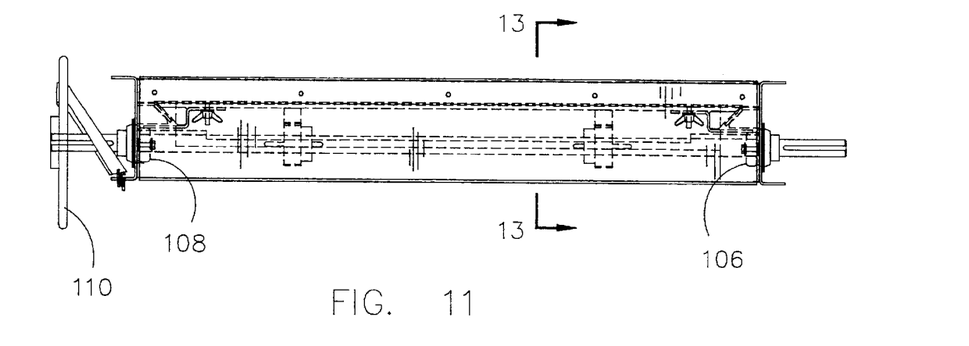
FIG. 11 is an end elevational view of the slide gate apparatus.
Figure 12:
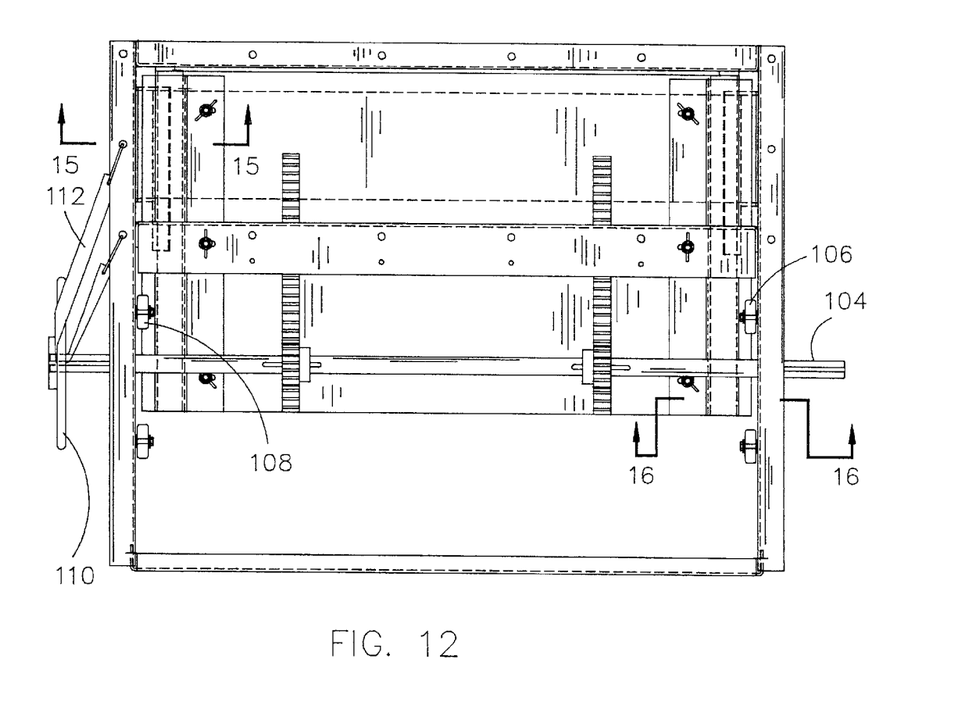
FIG. 12 is a bottom elevational view of the slide gate apparatus.
Figure 13:
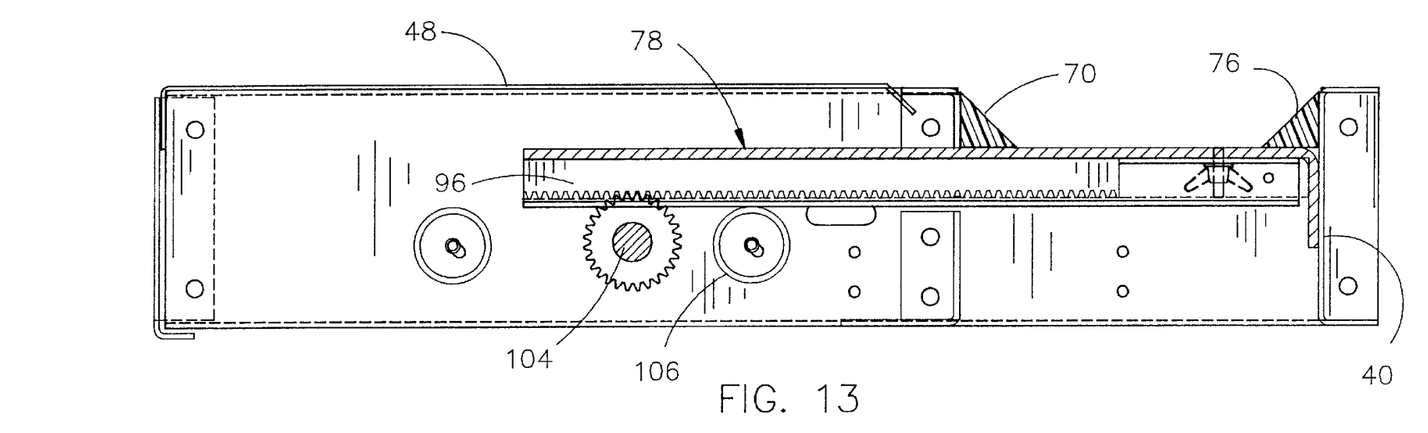
FIG. 13 is an enlarged sectional view as seen on lines 13—13 of FIG. 11.
Figure 14:
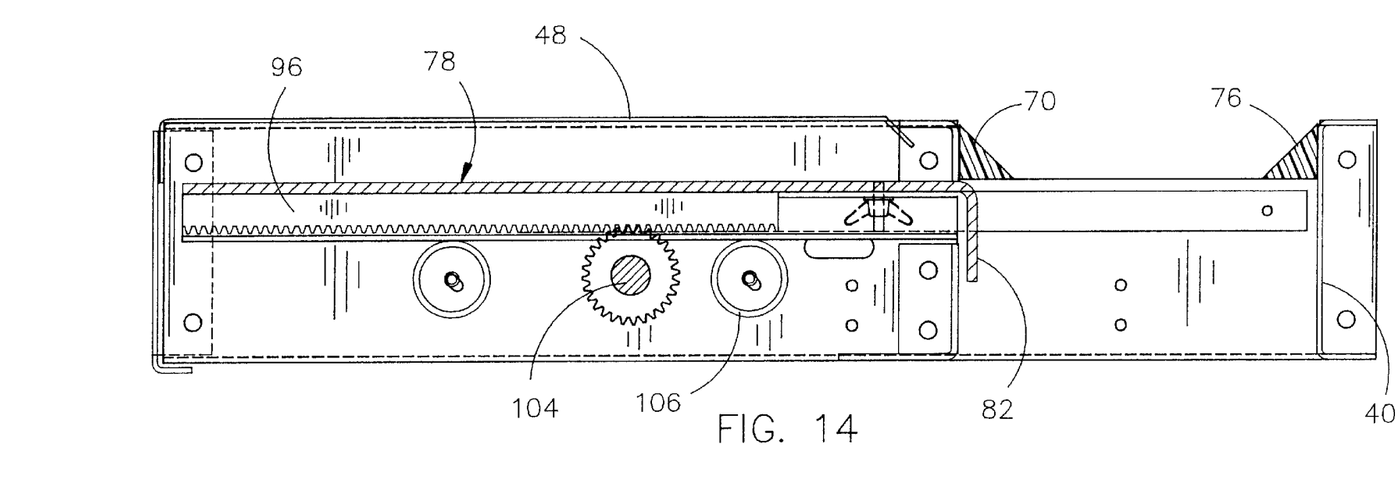
FIG. 14 is a view similar to FIG. 13 except that the slide gate is in its open position.

For purposes of description, each of the housing sections of conveyor housing 14 will be described as including a bottom section 30, sides 32 and 34, and top 36, as seen in FIG. 2. As seen in FIG. 2, the bottom section 30 includes an upper end generally designated by the reference numeral 38 which is shaped to receive and support the flights 28 and which is defined by side members 38A, 38B, and bottom member 38C. A portion of the bottom member 38C is removed to create an opening therein. It is that opening with which the slide gate apparatus 10 is associated with, as will be described hereinafter and as illustrated in FIG. 8.

Figure 5:
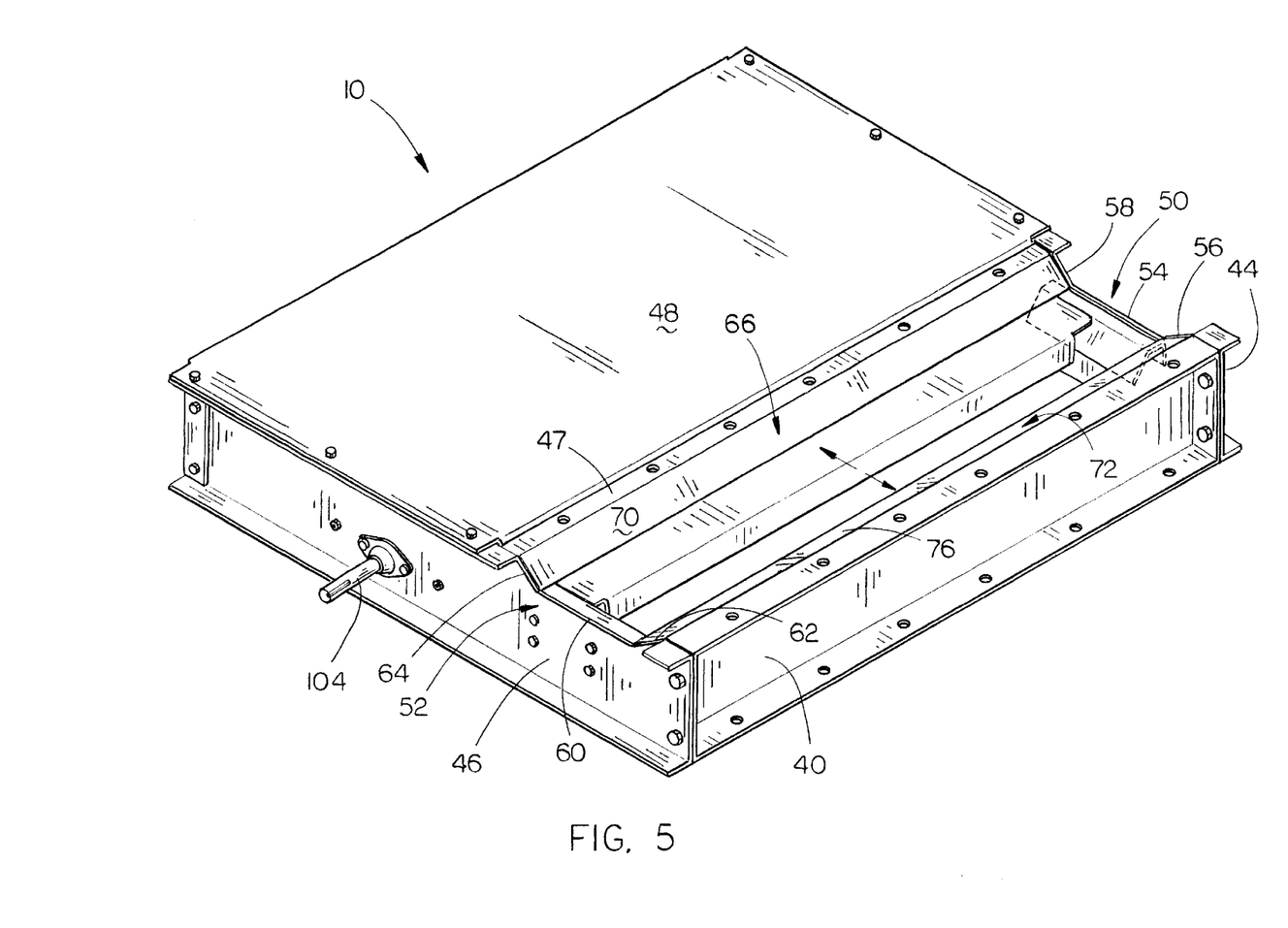
FIG. 5 is a partial perspective view of the slide gate apparatus of this invention.
Figure 6:
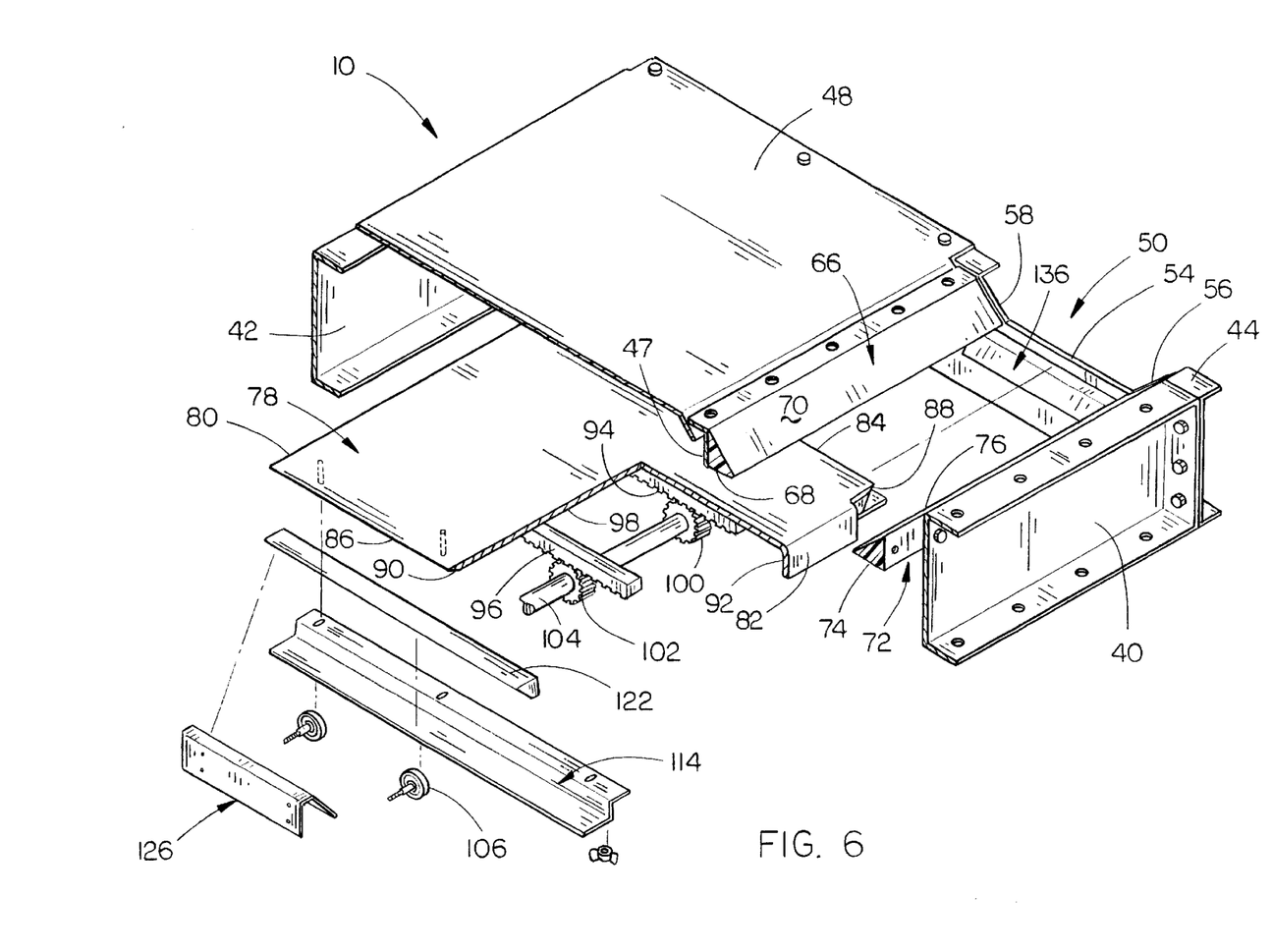
FIG. 6 is a partial exploded perspective view of the slide gate apparatus of this invention.

The slide gate apparatus includes a pair of spaced-apart frame members 40 and 42 having frame members 44 and 46 secured thereto and extending between the ends 20 thereof, as illustrated in FIGS. 5 and 6. Frame member 47 is secured to frame members 44 and 46 and extends therebetween adjacent the inner end of cover member 48. Cover member 48 has its outer end secured to the upper end of frame member 42 and extends toward frame member 40, as seen in FIG. 6. As seen in FIG. 5, the upper inner ends of frame members 44 and 46 are provided with openings 50 and 52, respectively. As seen in FIG. 6, opening 50 defines a bottom portion 54 and upwardly and outwardly extending side portions 56 and 58. As seen in FIG. 5, opening 52 defines a bottom portion 60 and upwardly and outwardly extending side portions 62 and 64. The openings 50 and 52 are shaped so that they are complimentary with the upper end 38 of the bottom section 30 to enable the slide gate apparatus to be positioned at the bottom of the conveyor.

An elongated seal 66 is secured, by screws, to the upper end of frame member 47 and is generally triangular in cross-section to provide a bottom portion 68 and a downwardly and inwardly extending side portion 70. Similarly, an elongated seal member 72 is secured, by screws, to the upper inner end of frame member 40 and includes a bottom portion 74 and a downwardly and inwardly extending side portion 76.

The numeral 78 refers to the movable slide gate of this invention which includes an outer end 80, inner end 82, and opposite ends 84 and 86. As seen in FIG. 6, the ends 84 and 86 are provided with tapered portions 88 and 90, respectively. As seen in FIG. 6, the inner end 82 of slide gate 78 includes a downwardly extending portion which is generally referred to by the reference numeral 92.

A pair of elongated gear racks 94 and 96 are secured to the bottom surface 98 of slide gate 78 by any convenient means. Gear racks 94 and 96 are in gear engagement with gears or sprockets 100 and 102 which are mounted on a shaft 104 which has one end rotatably mounted in frame member 54 and which has its other end protruding outwardly from frame member 46. A plurality of spaced-apart rollers 106 are rotatably mounted at the inside surface of frame member 46 and a pair of spaced-apart rollers 108 are operatively secured to the inner surface of frame member 54. A crank wheel 110 is secured to either end of the shaft 104 for moving the slide gate between its open and closed positions, as will be described hereinafter. Crank wheel 110 is maintained in position by a bungee cord assembly 112 to maintain the slide gate in its open or closed position. Thus, rotation of crank wheel 110 causes the rotation of gears 100 and 102 which causes the slide gate 78 to move either to its closed position or to its open position depending upon the direction of rotation of the crank reel 110. Although a manual crank wheel 110 has been described, the shaft 104 could be rotated by other suitable means such as a hydraulic motor, electric motor, etc. Further, a hydraulic cylinder could be used to slidably move the gate.

Figure 15:
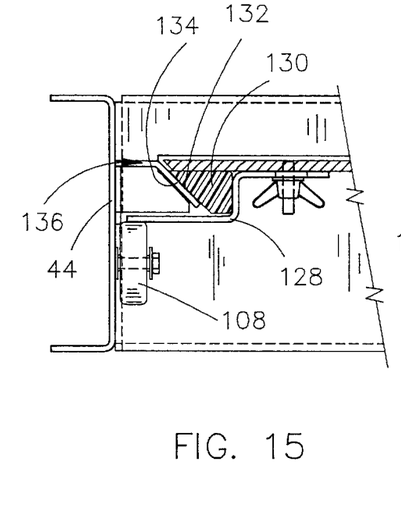
FIG. 15 is a partial sectional view as seen on lines 15—15 of FIG. 12.
Figure 16:
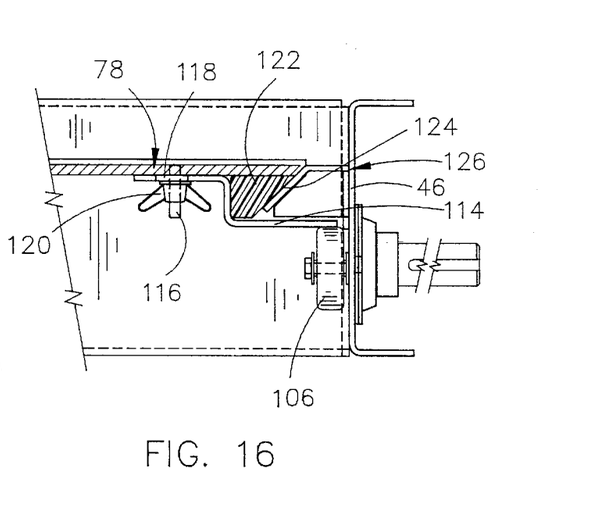
FIG. 16 is a partial sectional view as seen on ones 16—16 of FIG. 12.

An elongated Z-shaped gate support 114 is adjustably secured to one side of slide gate 78, as seen in FIG. 16. A plurality of studs or bolts 116 are secured to slide gate 78 and extend downwardly therefrom and are received by slots 118 in the support 114. The support 114 is held in its adjusted position by means of a wing nut 120. Seal member 122 is secured to support 114 and includes an outer face 124 which is adapted to sealably slide upon a generally L-shaped ramp 126 which is secured to the inner surface of frame member 46, as seen in FIG. 16. Similarly, an elongated Z-shaped support 128 is adjustably secured to side gate 78 in the same manner as support 114. Seal 130 is secured to support 128 and includes an inclined face 132 which sealably and slidably engages the inwardly and downwardly inclined face 134 of the ramp 136. The outer ends of the supports 114 and 128 roll upon the upper ends of the rollers 106 and 108 to support the slide gate 78 as it is moved between its open and closed positions. The supports 114 and 128 may be selectively adjusted with respect to the slide gate 78 so that the seals 122 and 130 are in the proper sealing engagement with the ramps 126 and 134, respectively. As seen in FIGS. 15 and 16, the beveled or angled outer ends 84 and 86 of slide plate 78 closely engage the inclined portions of the ramps 126 and 136, respectively. The upper horizontal surfaces of the ramps 126 and 136 are flush with the discharge opening created in the bottom of the conveyor housing. As seen in FIGS. 15 and 16, when the slide gate 78 is in its closed position, the upper surface thereof is flush with the upper horizontal surfaces of the ramps 126 and 136 and are flush with the upper surface of the bottom wall of the conveyor housing.

Figure 17:
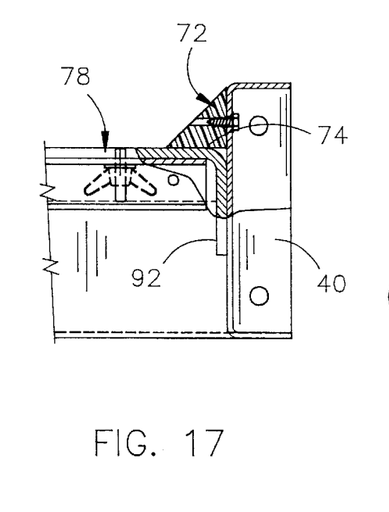
FIG. 17 is a partial sectional view.
Figure 18:
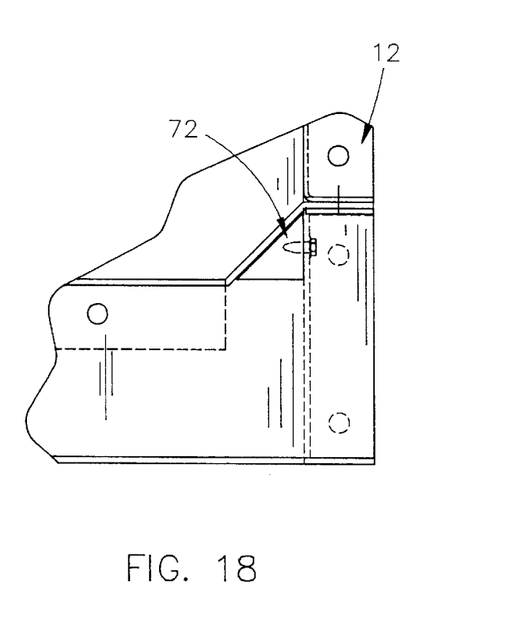
FIG. 18 is a partial sectional view.

When the slide gate 78 is in its closed position, the upper inner surface thereof is in sealing engagement with the bottom surface 74 of seal 72 (FIG. 17), with the slide gate 78 also being in sealing engagement with the bottom surface 68 of seal 66 The upper inner end of slide gate 78 may be drawn into sealable engagement with the bottom 74 of seal 72 and with the bottom 68 of seal 70 by adjustment of the supports 114 and 128. For example, if the supports 114 and 128 are moved outwardly with respect to the slide gate 78, the seals 122 and 130 will move upwardly on the inclined portions of the ramps 126 and 136 which will cause the slide gate 78 to move upwardly. Conversely, if the supports 114 and 128 are moved inwardly with respect to the slide gate 78, the seals 122 and 130 will move downwardly on the inclined faces of the ramps 126 and 136 which will cause the slide gate 78 to move downwardly.

It can therefore be seen that a novel slide gate has been provided which may be moved transversely with respect to the longitudinal of the conveyor housing with the slide gate being movable between closed and open positions. When the slide gate 78 is in its closed position, the slide gate 78 effectively is positioned within the discharge opening in the conveyor housing so that the upper surface of the slide gate 78 is substantially flush with the upper surface of the bottom wall of the conveyor housing thereby eliminating any space within which particulate material may accumulate. Further, the fact that the upper surface of the slide gate 78 presents a substantially smooth, uninterrupted surface for the bottom of the conveyor eliminates wear on the flights of the conveyor.

Thus it can be seen that the invention accomplishes at least all of its stated objectives.

We claim:

1. A slide gate apparatus for use with an elongated conveyor including a conveyor housing having a bottom including downwardly and inwardly extending side portions and a flat bottom wall extending between the lower inner ends thereof, said bottom wall having a quadrilateral-shaped discharge opening formed therein, upstanding first and second sides and a top, the conveyor also including a chain which extends along the bottom and traverses the discharge opening, the chain having a plurality of flights extending therefrom for moving particulate matter along the bottom, the slide gate apparatus comprising:

a slide gate support adapted to be connected to the conveyor housing adjacent to the discharge opening;

a flat slide gate mounted on said slide gate support which is selectively slidably movable between a closed position wherein said slide gate closes the discharge opening and an open position wherein said slide gate is retracted from the discharge opening;

said slide gate being transversely movable with respect to the longitudinal axis of the conveyor housing;

said slide gate being received within the opening when said slide gate is in its said closed position.

2. The slide gate apparatus of claim 1 wherein the bottom wall of the conveyor housing has an upper surface and wherein said slide gate has an upper surface; said top surface of said slide gate being substantially flush with said top surface of said bottom wall when said slide gate is in its said closed position.

3. The slide gate apparatus of claim 2 wherein said slide gate has an inner end, an outer end, and opposite sides; said slide gate support having a pair of spaced-apart elongated guide ramps positioned thereon which are adapted to support said opposite sides of said slide gate when said slide gate is in its said closed position.

4. The slide gate apparatus of claim 3 wherein said slide gate has an elongated seal which is secured to each of said opposite sides thereof which sealably engages one of said ramps when said slide gate is in its said closed position.

5. The slide gate apparatus of claim 4 wherein each of said seals is selectively adjustably secured to said slide gate.

6. The slide gate apparatus of claim 5 wherein said seals and said ramps have angled mating faces.

7. The slide gate apparatus of claim 4 wherein each of said seals are operatively supported upon rollers.

8. The slide gate apparatus of claim 1 further including means for vertically adjustably moving said slide gate.

9. The slide gate apparatus of claim 1 further including seal means for sealing the discharge opening around said slide gate.

10. The slide gate apparatus of claim 2 further including a pair of elongated, spaced-apart seals which are positioned above said slide gate and which sealably engage the upper surface of said slide gate when said slide gate is in its closed position.

11. The slide gate apparatus of claim 10 wherein one of said elongated, spaced-apart seals engages the upper surface of said slide gate when said slide gate is in its open position.

* * * * *